US007480880B2

(12) United States Patent
Visweswariah et al.

(10) Patent No.: US 7,480,880 B2
(45) Date of Patent: Jan. 20, 2009

(54) METHOD, SYSTEM, AND PROGRAM PRODUCT FOR COMPUTING A YIELD GRADIENT FROM STATISTICAL TIMING

(75) Inventors: Chandramouli Visweswariah, Croton-on-Hudson, NY (US); Jinjun Xiong, Los Angeles, CA (US); Vladimir Zolotov, Putnam Valley, NY (US)

(73) Assignee: International Business Machines Corporation, Armonk, NY (US)

( * ) Notice: Subject to any disclaimer, the term of this patent is extended or adjusted under 35 U.S.C. 154(b) by 224 days.

(21) Appl. No.: 11/358,622

(22) Filed: Feb. 21, 2006

(65) Prior Publication Data

US 2007/0234252 A1 Oct. 4, 2007

(51) Int. Cl.
G06F 17/50 (2006.01)
G06F 17/10 (2006.01)
(52) U.S. Cl. .................................. 716/6; 716/2; 703/2
(58) Field of Classification Search ................. None
See application file for complete search history.

(56) References Cited

U.S. PATENT DOCUMENTS

| 5,886,908 A * | 3/1999 | Conn et al. .................... 703/2 |
| 2005/0065765 A1 | 3/2005 | Visweswariah |
| 2005/0066298 A1 | 3/2005 | Visweswariah |
| 2007/0143722 A1* | 6/2007 | Venkateswaran et al. ....... 716/6 |

OTHER PUBLICATIONS

Chang et al., "Statistical Timing Analysis Considering Spatial Correlations Using a Single PERT-like Traversal," ICCAD 2003, pp. 621-625.*
Guthaus et al., "Gate Sizing Using Incremental Parameterized Statistical Timing Analysis," 2005 IEEE, pp. 1026-1033.*

Chen et al., "Mind Evolutionary Computation for a Kind of Non-Numerical Optimization Problems," Proceedings of the Third Int'l Conference on Machine Learning and Cybernetics, Aug. 26-29, 2004, pp. 2257-2261.*
Jianchao et al. "An Mind-Evolution Method for Solving Numerical Optimization Problems," Proceedings of the 3rd World Congress on Intelligent Control and Automation, Jun. 28-Jul. 2, 2000, pp. 126-128.*
Clark, C., "The Greatest of a Finite Set of Random Variables," Operations Research, vol. 9, No. 2, Mar.-Apr. 1961, pp. 145-162.
Xin, L. et al., "Defining Statistical Sensitivity for Timing Optimization of Logic Circuits with Large-Scale Process and Environmental Variations," IEEE International Conference on Computer-Aided Design, San Jose, CA, Nov. 2005, pp. 1-8.
Agarwal, A. et al., "Circuit Optimization Using Statistical Static Timing Analysis," Design Automation Conference, Anaheim, CA, Jun. 2005, pp. 321-324.
Chopra, K. et al., "Parametric Yield Maximization Using Gate Sizing Based on Efficient Statistical Power and Delay Gradient Computation," ACM/IEEE International Conference on Computer-Aided Design, Nov. 2004, pp. 1023-1028.

* cited by examiner

*Primary Examiner*—Leigh Marie Garbowski
(74) *Attorney, Agent, or Firm*—Brian Verminski; Hoffman Warnick LLC

(57) ABSTRACT

The invention provides a method, system, and program product for determining a gradient of a parametric yield of an integrated circuit with respect to parameters of a delay of an edge of a timing graph of the circuit. A first aspect of the invention provides a method for determining a gradient of a parametric yield of an integrated circuit with respect to parameters of a delay of an edge of a timing graph of the circuit, the method comprising: conducting a statistical timing analysis; expressing a statistical circuit delay in terms of a delay of the edge; and computing a gradient of the statistical circuit delay with respect to parameters of the delay of the edge.

24 Claims, 5 Drawing Sheets cutset

METHOD, SYSTEM, AND PROGRAM PRODUCT FOR COMPUTING A YIELD GRADIENT FROM STATISTICAL TIMING

BACKGROUND OF THE INVENTION

1. Technical Field

The invention relates generally to computer-aided design of integrated circuits, and more particularly, to the optimization of a digital circuit based on yield considerations. Even more particularly, the invention relates to the computation of yield gradients using statistical timing.

2. Background Art

Variability in integrated circuits increases with each new technology generation. Sources of variability include manufacturing conditions, device fatigue, environmental variations, and phase-locked loop (PLL) variations.

In the past, static timing analyses have been used to determine the performance of a circuit. In static timing analysis, a circuit is mapped to a graph called a timing graph. The longest path through the timing graph is the performance-limiting (i.e., critical) path of the circuit. If the delay of the critical path is more than a required value, the circuit cannot function properly. That is, the circuit has a timing violation. Because of variability, only a fraction of all manufactured circuits can meet the required timing constraints. This fraction is called the parametric yield of the circuit.

Typically, a static timing analysis is conducted for a particular setting of each of the process and environmental parameters, such as the thickness of a metal layer, the lengths of transistors, temperature, supply voltage, etc. The set of values to which process parameters are assigned is called a process corner. Such a static timing analysis at a particular process corner is referred to as "deterministic" timing analysis.

Deterministic timing analysis only verifies timing at a few selected process corners. Because of variability, multiple deterministic timing analyses are generally required to accurately analyze a circuit. When a large number of independently variable process parameters must be modeled, the number of timing runs necessary using traditional deterministic static timing analysis makes such a method impractical. Optimization of circuits based on deterministic timing analysis is also problematic. In the presence of process variations, the critical path is no longer unique. In fact, each process corner may have a different critical path. Thus, guiding optimization by the results of a deterministic timing analysis may not be the most efficient way to optimize a circuit.

These problems are partially overcome by statistical or probabilistic timing analysis, as taught in Patent Application Publication No. 20050065765 to Visweswariah, which is hereby incorporated by reference. In such an analysis, timing quantities such as delays, arrival times, and slacks are not treated as single numbers, but as correlated probability distributions. As such, the full probability distribution of the performance of the circuit under the influence of variations is predicted by a single timing run.

In such a run, the statistical maximum of the delay of all paths of the circuit is predicted. This quantity is called "statistical circuit delay." It is to be noted that this quantity is not the delay of any particular path. Rather, it represents the statistical maximum of the delay of all paths of the circuit.

In addition to timing analysis, an important role of a static timing analyzer is to provide diagnostics that are useful for optimization of the circuit. Such optimization may be automated or manual, and discrete or continuous. Since the critical path is not unique, as explained above, diagnostics that cover the entire space of process variations are especially important. The concept of criticality was taught in Patent Application Publication No. 20050066298 to Visweswariah, which is hereby incorporated by reference. Simply defined, the criticality probability of an edge, node, or path of a timing graph is the probability of manufacturing a chip in which the edge, node or path is in the critical path. An efficient method of computing criticality probabilities of all edges of a timing graph was also taught in U.S. Patent Application Publication No. 20050066298.

Recently, a method for computing the sensitivity of the mean of the circuit's longest path to the mean or nominal delay of each circuit component was taught in "Defining statistical sensitivity for timing optimization of logic circuits with large-scale process and environmental variations" by Xin Li et al the IEEE International Conference on Computer-Aided Design, San Jose, Calif., November 2005. Unfortunately, this method does not compute yield gradients, and the sensitivities are computed by an inefficient chain-ruling method that propagates sensitivities through the timing graph.

Recently, a method for computing sensitivities in the context of statistical timing was taught by K. Chopra et al., "Parametric yield maximization using gate sizing based on efficient statistical power and delay gradient computation," at the International Conference on Computer-Aided Design, San Jose, Calif., November 2005. While this approach uses the concept of a cutset, it uses a numerical perturbation method for sensitivity computation, which is neither efficient nor accurate.

While criticality computation and sensitivity analysis provide valuable diagnostics, they still do not provide sufficient data for fully optimizing a circuit. More efficient optimization may be achieved if one were to know the gradient of a parametric yield (i.e., the circuit's yield due to variation in process parameters) with respect to the delay characteristics of one or more circuit components, e.g., the delay of each gate or the size of each transistor. To this extent, a need exists for a method for determining the gradient of a parametric yield relative to the delay characteristics or designable parameters of a circuit component.

SUMMARY OF THE INVENTION

The invention provides a method, system, and program product for determining a gradient of a yield of an integrated circuit with respect to parameters (characteristics) of a delay of an edge of a timing graph of the circuit.

A first aspect of the invention provides a method for determining a gradient of a parametric yield of an integrated circuit with respect to parameters of a delay of an edge of a timing graph of the circuit, the method comprising: conducting a statistical timing analysis; expressing a statistical circuit delay in terms of a delay of the edge; and computing a gradient of the statistical circuit delay with respect to parameters of the delay of the edge.

A second aspect of the invention provides a system for determining a gradient of a parametric yield of an integrated circuit with respect to parameters of a delay of an edge of a timing graph of the circuit, the system comprising: a system for conducting a statistical timing analysis; a system for expressing a statistical circuit delay in terms of a delay of the edge; and a system for computing a gradient of the statistical circuit delay with respect to parameters of the delay of the edge.

A third aspect of the invention provides a program product stored on a computer-readable medium, which when executed, determines a gradient of a parametric yield of an integrated circuit with respect to parameters of a delay of an edge of a timing graph of the circuit, the program product comprising: program code for conducting a statistical timing analysis; program code for expressing statistical circuit delay in terms of a delay of the edge; and program code for computing a gradient of the statistical circuit delay with respect to parameters of the delay of the edge.

A fourth aspect of the invention provides a method for deploying an application for determining a gradient of a parametric yield of an integrated circuit with respect to parameters of a delay of an edge of a timing graph of the circuit, comprising: providing a computer infrastructure being operable to: conduct a statistical timing analysis; express statistical circuit delay in terms of a delay of the edge; and compute a gradient of the statistical circuit delay with respect to parameters of the delay of the edge.

A fifth aspect of the invention provides a business method for determining a gradient of a parametric yield of an integrated circuit with respect to parameters of a delay of an edge of a timing graph of the circuit.

The illustrative aspects of the present invention are designed to solve the problems herein described and other problems not discussed, which are discoverable by a skilled artisan.

BRIEF DESCRIPTION OF THE DRAWINGS

These and other features of this invention will be more readily understood from the following detailed description of the various aspects of the invention taken in conjunction with the accompanying drawings that depict various embodiments of the invention, in which.

It is noted that the drawings of the invention are not to scale. The drawings are intended to depict only typical aspects of the invention, and therefore should not be considered as limiting the scope of the invention. In the drawings, like numbering represents like elements between the drawings.

DETAILED DESCRIPTION

As indicated above, the invention provides a method, system, and program product for continuously optimizing an integrated circuit based on yield considerations.

Figure 1A:
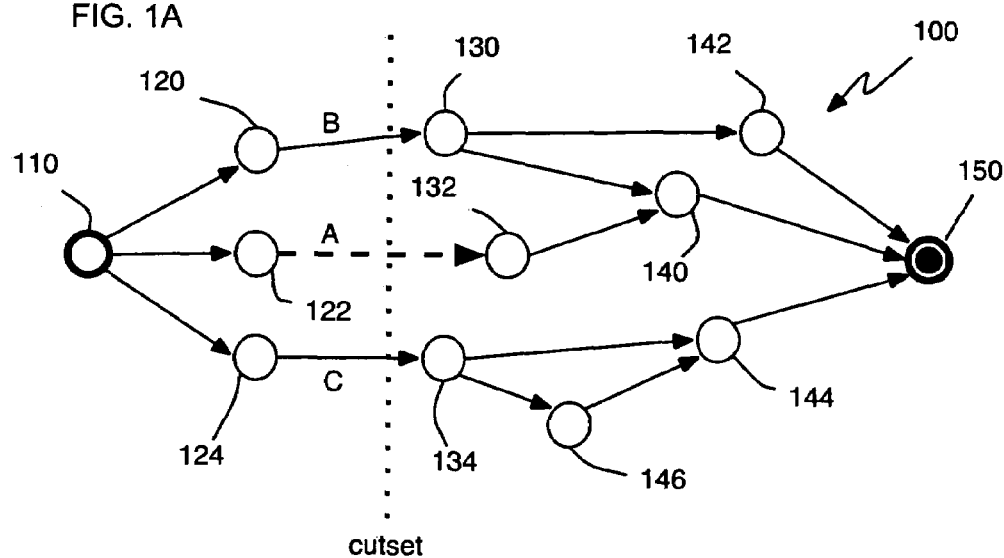
FIGS. 1A-B show aspects of a criticality probability analysis.
Figure 1B:
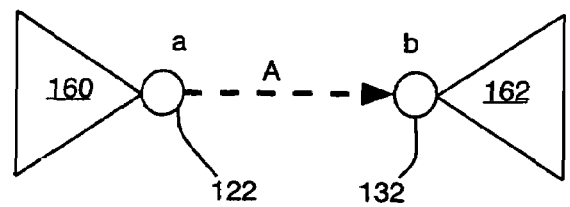

Referring now to FIGS. 1A-B, aspects of criticality probability analysis, upon which the invention is based, are shown. In FIG. 1A, a timing graph 100 is shown, comprising a plurality of nodes 110, 120, 122 . . . and edges (represented as unidirectional arrows) between pairs of nodes. As is known in the art, the first or "upstream" node 110 is designated the "source" of the timing graph and the terminal node 150 is designated the "sink" of the timing graph. The timing graph 100 of FIG. 1A is provided for purposes of explanation only. An actual timing graph may contain many more nodes and edges than those shown in FIG. 1A.

In performing a criticality probability analysis, one determines the probability of manufacturing an integrated circuit (i.e., a chip) in which a particular edge or node is included in the critical path. For example, in FIG. 1A, one may wish to know the probability that edge A (shown as a broken arrow between nodes 122 and 132) will lie in the critical path of the chip. Criticality probability analysis, such as that described in U.S. Patent Application Publication No. 20050066298 to Visweswariah, permits calculation of such a probability in an efficient manner.

The first step in computing the criticality probability of edge A is to find an appropriate cutset that includes edge A, as shown in FIG. 1A. The cutset divides the timing graph 100 into two sub-graphs, one of which includes the source node 110 and the other of which includes the sink node 150. All paths of timing graph 100 must pass through one and precisely one edge of the cutset.

In FIG. 1B, timing graph 100 of FIG. 1A has been simplified to show only those paths including edge A. Upstream nodes and edges 160 and downstream nodes and edges 162 are shown in simplified form. From FIG. 1B, an edge slack can be computed using the following equation:

$$\text{Edge slack} = AT_a + d_{ab} - RAT_b,$$

wherein $AT_a$ is the statistical maximum delay from the source node 110 to point a (i.e., node 122), dab is the statistical delay attributable to passage of the signal between points a and b (i.e., along edge A), and $RAT_b$ is the negative of the statistical maximum delay from point b (i.e., node 132) to the sink node 150. ATs and RATs of nodes of a timing graph are computed by statistical timing analysis as arrival times (AT) and required arrival times (RAT), respectively. The edge slack of edge A is the statistical maximum of the delays of all paths passing through edge A. Typically, an edge slack is calculated for each edge of the timing graph 100 (FIG. 1A) for which its corresponding nodes lie on opposite sides of a cutset (e.g., vertical dotted line of FIG. 1A). For example, referring to FIG. 1A, an edge slack would also typically be calculated for edges B and C.

According to the invention, additional computational steps are performed in addition to those shown above. First, a complement edge slack is computed. A complement edge slack is simply the statistical maximum of the edge slack of all edges in the cutset other than the edge of interest. The complement edge slack in the example shown in FIG. 1A is the statistical maximum of the edge slacks of edges B and C. The complement edge slack is the statistical maximum of the delays of all paths not passing through the edge of interest. Next, one computes the probability that the edge slack of edge A is statistically larger than the complement edge slack. This probability is the criticality probability of edge A.

The purpose of these additional steps is to find the total probability of the criticality of all paths that pass through the edge of interest (i.e., edge A). Since every path of the timing graph 100 (FIG. 1A) goes through precisely one edge of the cutset, for the edge to be included in the critical path, the ensemble longest path through it (i.e., its edge slack) must be larger than all other edge slacks. Thus, the probability that the edge slack of edge A is statistically larger than the complementary edge slack is the criticality probability of edge A.

U.S. Patent Application Publication No. 20050066298 to Visweswariah teaches efficient ways of finding suitable cutsets, efficient ways of computing edge slacks, efficient ways of processing the edge slacks of a cutset to obtain complement edge slacks, and efficient ways of computing the criticality probabilities of all edges of a timing graph.

The above computations do not, by themselves, provide a measure of how the parametric yield of the circuit is impacted by changing the delay characteristics of an edge of the timing graph. This problem is overcome by the present invention, particularly the steps described below, which provide the gradient of the parametric yield of a chip to all components of the statistical delay model of an edge of the timing graph. Computation of the yield gradient requires two additional steps. First, the dependence of the statistical circuit delay on the delay of a single edge must be isolated. Second, the parametric yield of the circuit must be expressed in terms of the cumulative distribution function (CDF) of the statistical delay of the circuit. The requisite yield gradients can then be obtained from the above two steps.

Figure 2:
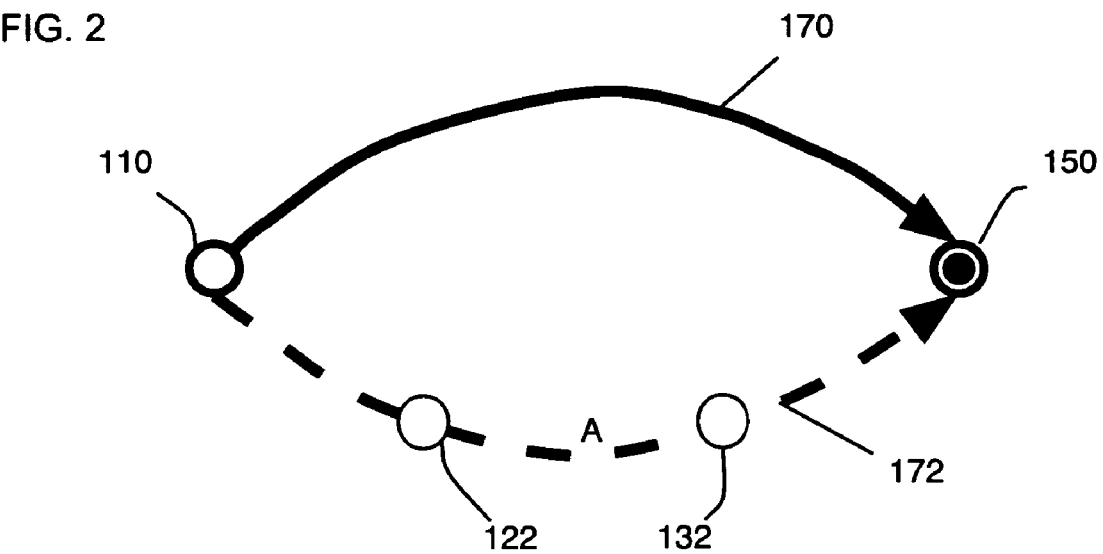
FIG. 2 shows a graphical representation of a step in the computation of a yield gradient according to the invention.

Referring now to FIG. 2, a figure useful in describing the derivation of yield gradients is shown. Arrow 170 represents the ensemble of all paths of the timing graph 100 (FIG. 1A) that do not pass through edge A. The statistical maximum of all delays of these paths is the complement edge slack of edge A. It can be expressed by the equation $$B = b_0 + \sum_{i=1}^{n} b_i X_i + b_r X_B,$$

wherein $X_i$ represents globally correlated random variation, i=1, 2, ..., n, $X_B$ represents uncorrelated random variation, $b_0$ represents the mean or nominal delay, $b_i$ represents the sensitivity to random variation $X_i$, and $b_r$ represents the sensitivity to random variation $X_B$.

The above equation assumes that all statistical quantities are expressed in a so-called "first-order canonical form" taught in Patent Application Publication No. 200500665298 to Visweswariah. It is to be noted that the present invention can be applied to any other form that is chosen for expressing statistical quantities.

Arrow 172, on the other hand, represents the ensemble of all paths of the timing graph 100 passing through edge A. The arrival time (AT) at node 122 represents the statistical maximum of the delay of the ensemble of paths from the source node 110 to node 122 and may be represented by the equation:

$$AT_a = AT_0 + \sum_{i=1}^{n} AT_i X_i + AT_r X_{AT},$$

wherein $X_i$ represents globally correlated random variation, i=1, 2, ..., n, $X_{AT}$ represents uncorrelated random variation, $AT_0$ represents the mean or nominal arrival time, $AT_i$ represents the sensitivity to random variation $X_i$, and $AT_r$ represents the sensitivity to random variation $X_{AT}$.

Similarly, the required arrival time (RAT) at node 132 represents the negative of the statistical maximum of the delay of the ensemble of paths from node 132 to the sink node 150 and may be represented by the equation:

$$RAT_b = RAT_0 + \sum_{i=1}^{n} RAT_i X_i + RAT_r X_{RAT},$$

wherein $X_i$ represents globally correlated random variation, i=1, 2, ..., n, $X_{RAT}$ represents uncorrelated random variation, $RAT_0$ represents the mean or nominal required arrival time, $RAT_i$ represents the sensitivity to random variation $X_i$, and $RAT_r$ represents the sensitivity to random variation $X_{RAT}$.

Finally, the delay attributable to edge A itself may be represented by the equation:

$$Delay_A = Delay_0 + \sum_{i=1}^{n} Delay_i X_i + Delay_r X_{Delay},$$

wherein $X_i$ represents globally correlated random variation, i=1, 2, ..., n, $X_{Delay}$ represents uncorrelated random variation, $Delay_0$ represents the mean or nominal delay, $Delay_i$ represents the sensitivity to random variation $X_i$, and $Delay_r$ represents the sensitivity to random variation $X_{Delay}$.

As can be seen in FIG. 2, all paths of the timing graph 100 (FIG. 1A) have been separated into two groups: those that pass through edge A and those that do not. This effectively isolates the impact of edge A on the statistical circuit delay.

Next, the statistical circuit delay is expressed as the statistical maximum of the delay of all circuit paths in FIG. 2:

$$\begin{aligned}
\text{circuit delay} &\equiv Z = \max[\text{maximum delay of all paths through edge } A, \\
&\quad \text{maximum delay of all paths not through edge } A] \\
&= \max[\text{edge slack of } A, \\
&\quad \text{complement edge slack of edge } A] \\
&= \max[\text{edge slack of } A, \\
&\quad \max\{\text{all other edge slacks in the cutset}\}] \\
&= \max[(AT_a + Delay_A - RAT_b), B]
\end{aligned}$$

It should be noted that the complement edge slack B of edge A does not depend on the delay of edge A, since it represents statistical maximum of delays of the ensemble of paths that do not pass through edge A. Similarly, $AT_a$ and $RAT_b$ do not depend on the delay of edge A, since they represent the statistical maximum of delays of the paths "upstream" and "downstream" of edge A, respectively. As a result, the statistical circuit delay equation above can be differentiated to obtain the gradient of the statistical circuit delay to the components of edge A.

The statistical maximum operation in the equation above can be approximated analytically according to Clark, C. E., "*The greatest of a finite set of random variables*," Operations Research, 145-162 (1961). The equations thereof may be differentiated in a straightforward manner to obtain the gradients of the following functions:
  Mean of the longest path delay; and
  Standard deviation of the longest path delay,
with respect to the following parameters:
  Mean of the delay of any edge of interest (edge A in the example of FIG. 1A);
  Sensitivity of the delay of any edge of interest (edge A in the example of FIG. 1A) to any globally correlated random variation ($Delay_i$ in this example); and
  Sensitivity of the delay of any edge of interest (edge A in the example of FIG. 1A) to uncorrelated random variation ($Delay_r$ in this example).

Equations to perform such a straightforward differentiation of the statistical maximum operation are shown in Appendix A.

The second step is to express the parametric yield of the circuit in terms of the statistical circuit delay. Yield at a required performance is simply the probability that the statistical circuit delay is less than the clock cycle time dictated by the performance requirement. Since the optimization of a circuit can be carried out in many different ways, we introduce the concept of a "profit" function whose gradients we seek to compute. Profit is the quantity being maximized or constrained in the optimization. One example of a profit function is the yield at a required performance. This profit function implies that any chip with performance not lower than the requirement can be sold at a constant non-zero profit and any chip with performance lower than the requirement cannot be sold at all. Another example is the performance at a given required yield. Yet another example is a weighted sum of the parametric yield in various "bins" or performance ranges. The gradient of any such profit function can be computed once the gradients of the statistical circuit delay are known.

Let us first consider a profit function, which is the performance at a given yield, p, a constant. Let the statistical circuit delay be z. The statistical circuit delay that meets the yield requirement p is denoted by z(p), which can be written as $$z(p) = \Phi^{-1}(p)\sigma_z + z_0,$$

where $\Phi^{-1}(\ )$ denotes the inverse CDF (Cumulative Distribution Function) of a standard normal or Gaussian distribution, $z_0$ is the mean of z, and $\sigma_z$ is the standard deviation of z. Thus the gradient with respect to some delay component of some edge $d_i$ is $$\frac{\partial z(p)}{\partial d_i} = \Phi^{-1}(p)\frac{\partial \sigma_z}{\partial d_i} + \frac{\partial z_0}{\partial d_i},$$

which in turn is easily computed since gradients of the mean and standard deviation of z are known by applying the formulas in Appendix A.

Next, we consider a profit function which is the yield at a given performance, which translates into a requirement that the statistical circuit delay be less than or equal to T. The yield is therefore $$p(T) = \Phi\left(\frac{T - z_0}{\sigma_z}\right)$$

which can be differentiated to obtain the necessary profit gradients $$\frac{\partial p(T)}{\partial d_i} = \frac{1}{\sigma_z^2}\phi\left(\frac{T - z_0}{\sigma_z}\right)\left\{-\sigma_z\frac{\partial z_0}{\partial d_i} + (T - z_0)\frac{\partial \sigma_z}{\partial d_i}\right\}$$

where $\phi(\ )$ represents the PDF (Probability Density Function) of a standard normal or Gaussian distribution.

It is to be understood that once the gradients of the statistical circuit delay are known, one of ordinary skill in the art can derive methods for computing the gradients of various profit functions.

The yield gradients obtained above may be used in any number of ways useful in optimizing an integrated circuit. For example, the circuit may be optimized to maximize performance at a given yield (e.g., 90%). Alternatively, the circuit may be optimized to maximize yield at a required performance (e.g., clock frequency). Or the circuit may be optimized to maximize a profit function which is a weighted sum of the parametric yield in each of several "bins" or performance ranges.

Figure 3:
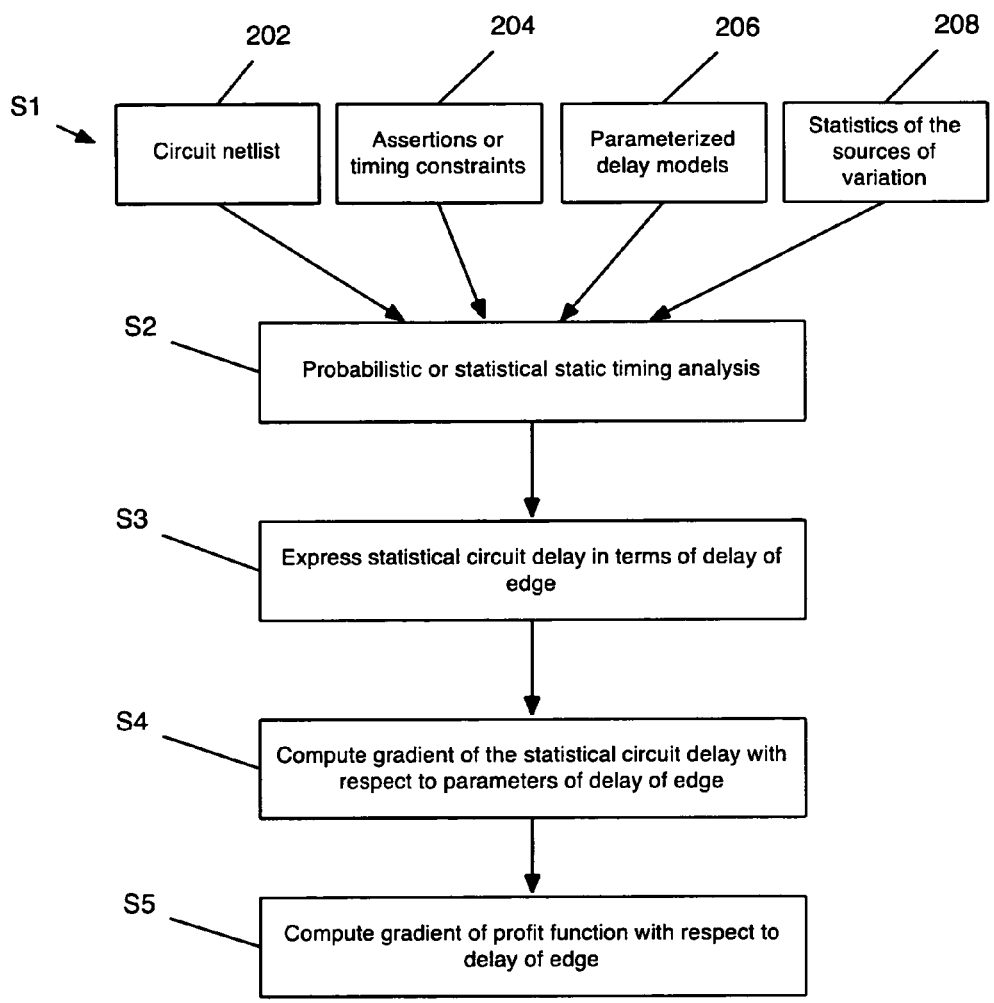
FIG. 3 shows a flow diagram of an illustrative method of yield gradient computation according to the invention.

In accordance with the above, FIG. 3 shows an inventive process for computing yield gradients. Step S1 shows the usual inputs to statistical timing. The first input is the netlist of the circuit to be analyzed 202. The next input is the set of timing assertions or timing constraints 204, which can include primary input arrival times, primary output required arrival times, external loading on the primary outputs, etc. A set of parameterized delay models 206 that capture the delay variability of circuit components is the third input. Finally, statistics of the sources of variation 208, including process and environmental parameters, comprise the final input. These can include means, standard deviations, distributions, and correlations among the sources of variation.

In step S2, a probabilistic or statistical static timing analysis is carried out using methods known in the art. In step S3, the statistical circuit delay is expressed in terms of the delay of an edge of interest. This is accomplished by identifying a suitable cutset, computing the edge slack and complement edge slack of the edge of interest, and expressing the statistical circuit delay as a statistical maximum of the edge slack and complement edge slack.

In step S4, the gradient of the mean and standard deviation of the statistical circuit delay with respect to the delay components of the edge of interest are computed by applying the formulas of Appendix A. The delay components may in turn be functions of physical parameters such as channel length or metal thickness, and this step includes any chain-ruling of gradients necessary.

Finally, in Step S5, the gradients of the profit function are computed by expressing these gradients in terms of the gradients of the mean and standard deviation of the statistical circuit delay.

Figure 4:
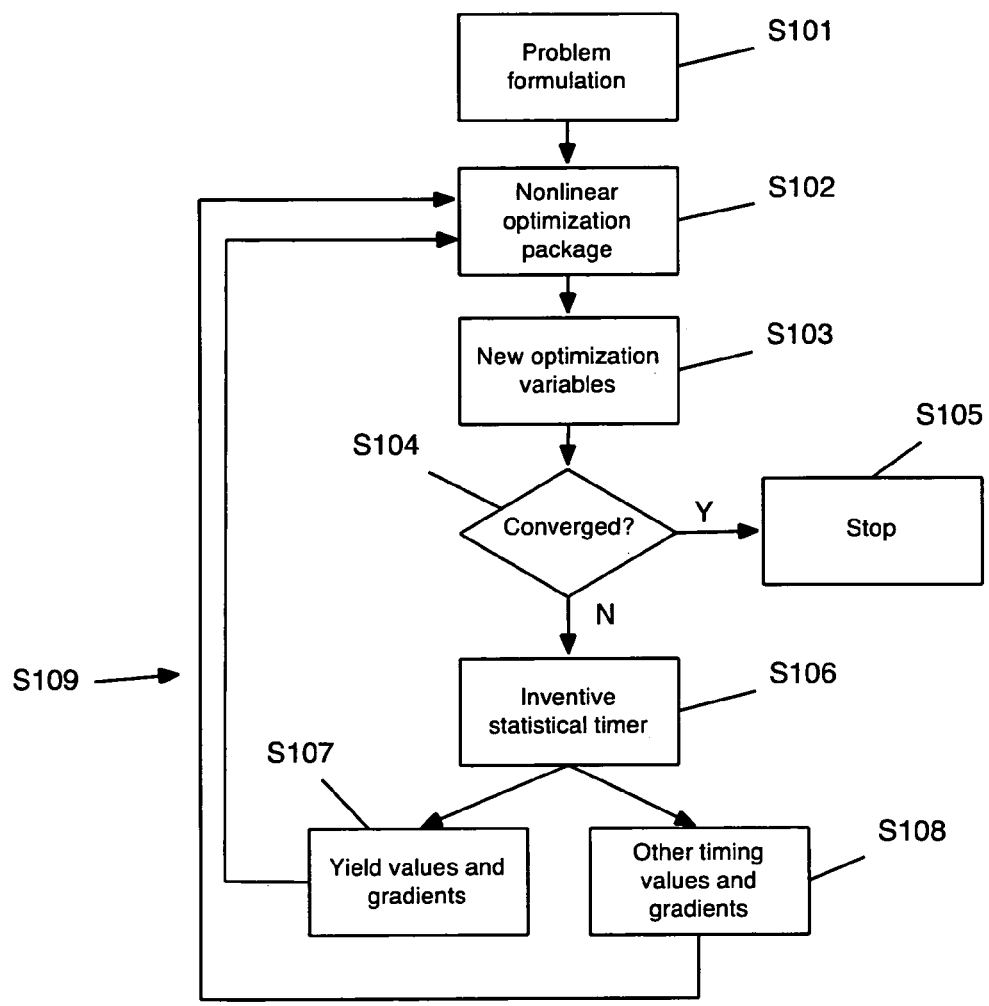
FIG. 4 shows a flow diagram of an illustrative method of circuit parametric yield optimization by using yield gradients computed according to the invention in conjunction with a nonlinear optimization package.

Yield gradients can be used for both discrete and continuous optimization of circuits. FIG. 4 shows how continuous optimization can be carried out using the inventive yield gradients. At step S101 a problem is formulated, comprising a statement of what is to be minimized or maximized, subject to what constraints, and subject to what simple bounds on the optimization variables. The problem statement of step S101 is fed to a nonlinear optimization package at step S102. At each iteration of the optimization, the nonlinear optimizer comes up with new assignments to the optimization variables at step S103. If convergence has been obtained ("Yes" at step S104), the optimization process is stopped (step S105). Convergence is obtained when the optimization variables cease to change or all optimization goals are met. Otherwise ("No" at step S104), the new optimization variables are applied to the inventive statistical timer at step 106. The timer produces both timing results (step S108) as well as yield and/or profit gradients (step S107). These are fed back to the nonlinear optimization package at step S109, where the nonlinear optimization package uses all the function and gradient values of the present and all past iterations to come up with the next set of optimization variables. This procedure is carried out until convergence is obtained ("Yes" at step S104) and the optimization process is stopped at step S105.

Although the above detailed description was explained in terms of late-mode timing, it is to be understood that one of ordinary skill in the art can apply the same concepts to early-mode timing. Similarly, the assumptions of Gaussian distributions or first-order canonical statistical quantities were made for demonstration purposes only, and the concepts apply to any distributions and any form chosen for statistical quantities. Although the above gradient computation was explained for one edge of interest, gradient computation for some or all edge delays can be computed simultaneously by the inventive method. While gradient computation with respect to delay components was explained, gradient computation with respect to dimensions (transistor width, length, wire length) or environmental values (temperature, supply voltage) or component values (resistance values, capacitance values) can be computed by the inventive method by chain-ruling that will be known to one skilled in the art. The inventive techniques are applicable to all kinds of circuits, including combinational and sequential, and gate-level, block-level transistor-level, or mixed-level circuit representations.

Figure 5:
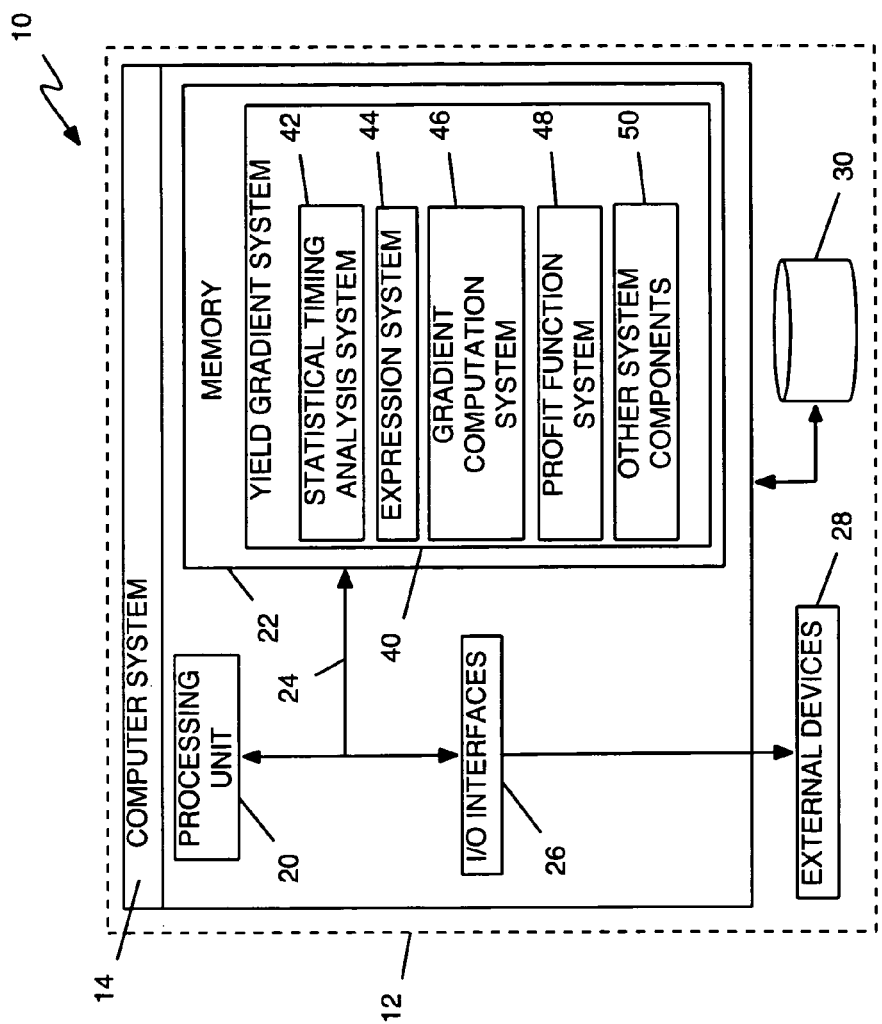
FIG. 5 shows a block diagram of an illustrative system according to the invention.

FIG. 5 shows an illustrative system 10 for computing yield gradients from statistical timing. To this extent, system 10 includes a computer infrastructure 12 that can perform the various process steps described herein for computing yield gradients from statistical timing. In particular, computer infrastructure 12 is shown including a computer system 14 that comprises a yield gradient system 40, which enables computer system 14 to compute yield gradients from statistical timing by performing the process steps of the invention.

Computer system 14 is shown including a processing unit 20, a memory 22, an input/output (I/O) interface 26, and a bus 24. Further, computer system 14 is shown in communication with external devices 28 and a storage system 30. As is known in the art, in general, processing unit 20 executes computer program code, such as yield gradient system 40, that is stored in memory 22 and/or storage system 30. While executing computer program code, processing unit 20 can read and/or write data from/to memory 22, storage system 30, and/or I/O interface 26. Bus 24 provides a communication link between each of the components in computer system 14. External devices 28 can comprise any device that enables a user (not shown) to interact with computer system 14 or any device that enables computer system 14 to communicate with one or more other computer systems.

In any event, computer system 14 can comprise any general purpose computing article of manufacture capable of executing computer program code installed by a user (e.g., a personal computer, server, handheld device, etc.). However, it is understood that computer system 14 and yield gradient system 40 are only representative of various possible computer systems that may perform the various process steps of the invention. To this extent, in other embodiments, computer system 14 can comprise any specific purpose computing article of manufacture comprising hardware and/or computer program code for performing specific functions, any computing article of manufacture that comprises a combination of specific purpose and general purpose hardware/software, or the like. In each case, the program code and hardware can be created using standard programming and engineering techniques, respectively.

Similarly, computer infrastructure 12 is only illustrative of various types of computer infrastructures for implementing the invention. For example, in one embodiment, computer infrastructure 12 comprises two or more computer systems (e.g., a server cluster) that communicate over any type of wired and/or wireless communications link, such as a network, a shared memory, or the like, to perform the various process steps of the invention. When the communications link comprises a network, the network can comprise any combination of one or more types of networks (e.g., the Internet, a wide area network, a local area network, a virtual private network, etc.). Regardless, communications between the computer systems may utilize any combination of various types of transmission techniques.

As previously mentioned, yield gradient system 40 enables computer system 14 to compute yield gradients from statistical timing. To this extent, yield gradient system 40 is shown including a statistical timing analysis system 42, an expression system 44, a gradient computation system 46, and a profit function system 48. Operation of each of these systems is discussed above. Yield gradient system 40 may further include other system components 50 to provide additional or improved functionality to yield gradient system 40. It is understood that some of the various systems shown in FIG. 5 can be implemented independently, combined, and/or stored in memory for one or more separate computer systems 14 that communicate over a network. Further, it is understood that some of the systems and/or functionality may not be implemented, or additional systems and/or functionality may be included as part of system 10.

While shown and described herein as a method and system for computing yield gradients from statistical timing, it is understood that the invention further provides various alternative embodiments. For example, in one embodiment, the invention provides a computer-readable medium that includes computer program code to enable a computer infrastructure to compute yield gradients from statistical timing. To this extent, the computer-readable medium includes program code, such as yield gradient system 40, that implements each of the various process steps of the invention. It is understood that the term "computer-readable medium" comprises one or more of any type of physical embodiment of the program code. In particular, the computer-readable medium can comprise program code embodied on one or more portable storage articles of manufacture (e.g., a compact disc, a magnetic disk, a tape, etc.), and/or on one or more data storage portions of a computer system, such as memory 22 and/or storage system 30 (e.g., a fixed disk, a read-only memory, a random access memory, a cache memory, etc.).

In another embodiment, the invention provides a business method that performs the process steps of the invention on a subscription, advertising, and/or fee basis. That is, a service provider could offer to compute yield gradients from statistical timing as described above. In this case, the service provider can create, maintain, support, etc., a computer infrastructure, such as computer infrastructure 12, that performs the process steps of the invention for one or more customers. In return, the service provider can receive payment from the customer(s) under a subscription and/or fee agreement and/or the service provider can receive payment from the sale of advertising space to one or more third parties.

In still another embodiment, the invention provides a method of generating a system for computing yield gradients from statistical timing. In this case, a computer infrastructure, such as computer infrastructure 12, can be obtained (e.g., created, maintained, having made available to, etc.) and one or more systems for performing the process steps of the invention can be obtained (e.g., created, purchased, used, modified, etc.) and deployed to the computer infrastructure. To this extent, the deployment of each system can comprise one or more of (1) installing program code on a computer system, such as computer system 14, from a computer-readable medium; (2) adding one or more computer systems to the computer infrastructure; and (3) incorporating and/or modifying one or more existing systems of the computer infrastructure, to enable the computer infrastructure to perform the process steps of the invention.

As used herein, it is understood that the terms "program code" and "computer program code" are synonymous and mean any expression, in any language, code or notation, of a set of instructions intended to cause a computer system having an information processing capability to perform a particular function either directly or after either or both of the following: (a) conversion to another language, code or notation; and (b) reproduction in a different material form. To this extent, program code can be embodied as one or more types of program products, such as an application/software program, component software/a library of functions, an operating system, a basic I/O system/driver for a particular computing and/or I/O device, and the like.

The foregoing description of various aspects of the invention has been presented for purposes of illustration and description. It is not intended to be exhaustive or to limit the invention to the precise form disclosed, and obviously, many modifications and variations are possible. Such modifications and variations that may be apparent to a person skilled in the art are intended to be included within the scope of the invention as defined by the accompanying claims.

APPENDIX A

Formulas for differentiation of the statistical maximum operation are included in this Appendix.

Appendix A

Differentiation of the Max Operation

This Appendix derives formulas for differentiation of the statistical max operator with respect to its arguments. While this appendix assumes that the max operator is implemented as taught in C. Visweswariah et al, "First-order incremental block-based statistical timing analysis," Proceedings of the 2004 Design Automation Conference, San Diego, Calif., June 2004, it is to be understood that similar differentiation formulas can be readily derived for any other method of implementing the max operator. Likewise, formulas for differentiation of the min operator can also be derived.

A.1 Preliminaries

Let A and B be two first-order canonical forms $$A = a_0 + \Sigma a_i X_i + a_r X_A, \quad (A.1)$$

$$B = b_0 + \Sigma b_i X_i + b_r X_B, \quad (A.2)$$

where $X_i$ are the correlated unit-Gaussian random variations, $X_A$ and $X_B$ are uncorrelated unit-Gaussian random variations, $a_i$ and $b_i$ are sensitivities to correlated random variations, and $a_r$ and $b_r$ are the sensitivities to uncorrelated random variations, respectively. The variance of A and B and their covariance are $$\sigma^2_A = \Sigma a^2_i + a^2_r, \quad (A.3)$$

$$\sigma^2_B = \Sigma b^2_i + b^2_r, \quad (A.4)$$

$$\mathrm{cov}(A,B) = \Sigma a_i b_i. \quad (A.5)$$

Some frequently-used equations are listed below.

$$\phi(r) \equiv \frac{1}{\sqrt{2\pi}} \exp\left(-\frac{r^2}{2}\right) \quad (A.6)$$

$$\Phi(r) \equiv \int_{-\infty}^{r} \phi(q)\,dq \quad (A.7)$$

-continued $$\theta \equiv (\sigma^2_A + \sigma^2_B - 2\mathrm{cov}(A, B))^{\frac{1}{2}} \quad (A.8)$$

$$\frac{\partial \phi(r)}{\partial r} = -r\frac{1}{\sqrt{2\pi}}\exp\left(-\frac{r^2}{2}\right) = -r\phi(r) \quad (A.9)$$

$$\frac{\partial \Phi(r)}{\partial r} = \phi(r). \quad (A.10)$$

Let $Z = \max(A, B)$. The mean of Z is given by $$z_0 = \Phi\left(\frac{a_0 - b_0}{\theta}\right)a_0 + \left[1 - \Phi\left(\frac{a_0 - b_0}{\theta}\right)\right]b_0 + \theta\phi\left(\frac{a_0 - b_0}{\theta}\right) \quad (A.11)$$

$$= \Phi a_0 + (1 - \Phi)b_0 + \theta\phi.$$

For simplicity, we have used $\phi$ and $\Phi$ to represent $$\Phi\left(\frac{a_0 - b_0}{\theta}\right) \text{ and } \phi\left(\frac{a_0 - b_0}{\theta}\right).$$

This notation will be used wherever there is no ambiguity. The variance of Z is $$\sigma^2_Z = (\sigma^2_A + a^2_0)\Phi + (\sigma^2_B + b^2_0)(1 - \Phi) + (a_0 + b_0)\theta\phi - z^2_0. \quad (A.12)$$

We are interested in the sensitivity of $z_0$ and $\sigma_Z$ to the $a_i$, $b_i$, $a_r$ and $b_r$ parameters. Because of the symmetry between A and B, we will only focus on the derivation of sensitivity with respect to $a_0$, $a_i$ and $a_r$.

A.2 Sensitivity of Mean

A.2.1 With Respect to Mean

We first derive the sensitivity of $z_0$ with respect to $a_0$.

$$\frac{\partial z_0}{\partial a_0} = \frac{\partial \Phi}{\partial a_0}a_0 + \Phi - \frac{\partial \Phi}{\partial a_0}b_0 + \frac{\partial \theta}{\partial a_0}\phi + \theta\frac{\partial \phi}{\partial a_0}. \quad (A.13)$$

It is easy to show that the following equations hold.

$$\frac{\partial \theta}{\partial a_0} = 0, \quad (A.14)$$

$$\frac{\partial \Phi}{\partial a_0} = \phi\left(\frac{a_0 - b_0}{\theta}\right)\frac{1}{\theta} = \frac{\phi}{\theta}, \text{ and} \quad (A.15)$$

$$\frac{\partial \phi}{\partial a_0} = -\frac{a_0 - b_0}{\theta}\phi\left(\frac{a_0 - b_0}{\theta}\right)\frac{1}{\theta} = -\frac{a_0 - b_0}{\theta^2}\phi. \quad (A.16)$$

Therefore, we have $$\frac{\partial z_0}{\partial a_0} = (a_0 - b_0)\frac{\phi}{\theta} + \Phi - \frac{a_0 - b_0}{\theta^2}\phi\theta = \Phi. \quad (A.17)$$

A.2.2 With Respect to Correlated Sensitivity

Next, we derive the sensitivity of $z_0$ with respect to the correlated sensitivity term $a_i$.

$$\frac{\partial z_0}{\partial a_i} = \frac{\partial \Phi}{\partial a_i} a_0 - \frac{\partial \Phi}{\partial a_i} b_0 + \frac{\partial \theta}{\partial a_i} \phi + \theta \frac{\partial \phi}{\partial a_i}. \quad (A.18)$$

It is easy to show that the following equations hold.

$$\frac{\partial \Phi}{\partial a_i} = \phi \frac{\partial \left(\frac{a_0 - b_0}{\theta}\right)}{\partial a_i} = -\phi \frac{a_0 - b_0}{\theta^2} \frac{\partial \theta}{\partial a_i}, \text{ and} \quad (A.19)$$

$$\frac{\partial \phi}{\partial a_i} = -\frac{a_0 - b_0}{\theta} \phi \frac{\partial \left(\frac{a_0 - b_0}{\theta}\right)}{\partial a_i} = \frac{(a_0 - b_0)^2}{\theta^3} \phi \frac{\partial \theta}{\partial a_i}. \quad (A.20)$$

Therefore, we have $$\begin{aligned}\frac{\partial z_0}{\partial a_i} &= -\phi \frac{a_0 - b_0}{\theta^2} \frac{\partial \theta}{\partial a_i}(a_0 - b_0) + \frac{\partial \theta}{\partial a_i} \phi + \theta \frac{(a_0 - b_0)^2}{\theta^3} \phi \frac{\partial \theta}{\partial a_i} \quad (A.21) \\ &= \left\{-\frac{(a_0 - b_0)^2}{\theta^2} + 1 + \theta \frac{(a_0 - b_0)^2}{\theta^3}\right\} \phi \frac{\partial \theta}{\partial a_i} \\ &= \phi \frac{\partial \theta}{\partial a_i}.\end{aligned}$$

We need to compute $$\frac{\partial \theta}{\partial a_i},$$

which is given by $$\begin{aligned}\frac{\partial \theta}{\partial a_i} &= \frac{\partial (\sigma_A^2 + \sigma_B^2 - 2\text{cov}(A, B))^{1/2}}{\partial a_i} \quad (A.22) \\ &= \frac{1}{2\theta} \frac{\partial (\sigma_A^2 + \sigma_B^2 - 2\text{cov}(A, B))}{\partial a_i} \\ &= \frac{1}{2\theta} \left\{\frac{\partial \sigma_A^2}{\partial a_i} + \frac{\partial \sigma_B^2}{\partial a_i} - 2\frac{\partial \text{cov}(A, B)}{\partial a_i}\right\} \\ &= \frac{1}{2\theta}(2a_i + 0 - 2b_i) \\ &= (a_i - b_i)\frac{1}{\theta}.\end{aligned}$$

Therefore, in summary, we have $$\frac{\partial z_0}{\partial a_i} = (a_i - b_i)\frac{\phi}{\theta} \quad (A.23)$$

A.2.3 With Respect to Uncorrelated Sensitivity

We derive the sensitivity of $z_0$ with respect to the uncorrelated sensitivity term $a_r$.

$$\frac{\partial z_0}{\partial a_r} = \frac{\partial \Phi}{\partial a_r} a_0 - \frac{\partial \Phi}{\partial a_r} b_0 + \frac{\partial \theta}{\partial a_r} \phi + \theta \frac{\partial \phi}{\partial a_r}. \quad (A.24)$$

It is easy to show that the following equations hold.

$$\frac{\partial \Phi}{\partial a_r} = \phi \frac{\partial \left(\frac{a_0 - b_0}{\theta}\right)}{\partial a_r} = -\phi \frac{a_0 - b_0}{\theta^2} \frac{\partial \theta}{\partial a_r}, \text{ and} \quad (A.25)$$

$$\frac{\partial \phi}{\partial a_r} = -\frac{a_0 - b_0}{\theta} \phi \frac{\partial \left(\frac{a_0 - b_0}{\theta}\right)}{\partial a_r} = \frac{(a_0 - b_0)^2}{\theta^3} \phi \frac{\partial \theta}{\partial a_r}. \quad (A.26)$$

Therefore, we have $$\begin{aligned}\frac{\partial z_0}{\partial a_r} &= -\phi \frac{a_0 - b_0}{\theta^2} \frac{\partial \theta}{\partial a_r}(a_0 - b_0) + \frac{\partial \theta}{\partial a_r} \phi + \theta \frac{(a_0 - b_0)^2}{\theta^3} \phi \frac{\partial \theta}{\partial a_r} \quad (A.27) \\ &= \left\{-\frac{(a_0 - b_0)^2}{\theta^2} + 1 + \theta \frac{(a_0 - b_0)^2}{\theta^3}\right\} \phi \frac{\partial \theta}{\partial a_r} \\ &= \phi \frac{\partial \theta}{\partial a_r}.\end{aligned}$$

We need to compute $$\frac{\partial \theta}{\partial a_r},$$

which is given by $$\begin{aligned}\frac{\partial \theta}{\partial a_r} &= \frac{\partial (\sigma_A^2 + \sigma_B^2 - 2\text{cov}(A, B))^{1/2}}{\partial a_r} \quad (A.28) \\ &= \frac{1}{2\theta} \frac{\partial (\sigma_A^2 + \sigma_B^2 - 2\text{cov}(A, B))}{\partial a_r} \\ &= \frac{1}{2\theta} \left\{\frac{\partial \sigma_A^2}{\partial a_r} + \frac{\partial \sigma_B^2}{\partial a_r} - 2\frac{\partial \text{cov}(A, B)}{\partial a_r}\right\} \\ &= \frac{1}{2\theta}(2a_r + 0 - 0) \\ &= a_r \frac{1}{\theta}.\end{aligned}$$

Therefore, in summary, we have $$\frac{\partial z_0}{\partial a_r} = a_r \frac{\phi}{\theta}. \quad (A.29)$$

A.3 Sensitivity of Sigma

A.3.1 With Respect to Mean

We derive the sensitivity of $\sigma_Z$ with respect to $a_0$.

$$\frac{\partial \sigma_Z^2}{\partial a_0} = 2\sigma_Z \frac{\partial \sigma_Z}{\partial a_0} \quad (A.30)$$

-continued $$= \left(\frac{\partial \sigma_A^2}{\partial a_0} + \frac{\partial a_0^2}{\partial a_0}\right)\Phi + (\sigma_A^2 + a_0^2)\frac{\partial \Phi}{\partial a_0} - (\sigma_B^2 + b_0^2)\frac{\partial \Phi}{\partial a_0} +$$

$$\theta\phi + (a_0 + b_0)\frac{\partial \theta}{\partial a_0}\phi + (a_0 + b_0)\theta\frac{\partial \phi}{\partial a_0} - 2z_0\frac{\partial z_0}{\partial a_0}$$

$$= 2a_0\Phi + (\sigma_A^2 + a_0^2)\frac{\phi}{\theta} - (\sigma_B^2 + b_0^2)\frac{\phi}{\theta} + \theta\phi -$$

$$(a_0 + b_0)\theta(a_0 - b_0)\frac{\phi}{\theta^2} - 2z_0\Phi$$

$$= 2(a_0 - z_0)\Phi + (\sigma_A^2 + a_0^2 - \sigma_B^2 - b_0^2)\frac{\phi}{\theta} -$$

$$(a_0^2 - b_0^2)\frac{\phi}{\theta} + \theta\phi$$

$$= 2(a_0 - z_0)\Phi + (\sigma_A^2 - \sigma_B^2)\frac{\phi}{\theta} + \theta\phi.$$

Therefore, in summary, we have $$\frac{\partial \sigma_Z}{\partial a_0} = \frac{1}{2\sigma_Z}\left\{2(a_0 - z_0)\Phi + (\sigma_A^2 - \sigma_B^2)\frac{\phi}{\theta} + \theta\phi\right\}. \quad (A.31)$$

A.3.2 With Respect to Correlated Sensitivity

We derive the sensitivity of $\sigma_Z$ with respect to the correlated sensitivity term $a_i$.

$$\frac{\partial \sigma_Z^2}{\partial a_i} = 2\sigma_Z \frac{\partial \sigma_Z}{\partial a_i} \quad (A.32)$$

$$= \left(\frac{\partial \sigma_A^2}{\partial a_i} + \frac{\partial a_0^2}{\partial a_i}\right)\Phi + (\sigma_A^2 + a_0^2)\frac{\partial \Phi}{\partial a_i} +$$

$$\left(\frac{\partial \sigma_B^2}{\partial a_i} + \frac{\partial b_0^2}{\partial a_i}\right)(1 - \Phi) - (\sigma_B^2 + b_0^2)\frac{\partial \Phi}{\partial a_i} +$$

$$\left(\frac{\partial a_0}{\partial a_i} + \frac{\partial b_0}{\partial a_i}\right)\theta\phi + (a_0 + b_0)\frac{\partial \theta}{\partial a_i}\phi +$$

$$(a_0 + b_0)\theta\frac{\partial \phi}{\partial a_i} - 2z_0\frac{\partial z_0}{\partial a_i}$$

$$= 2a_i\Phi - (\sigma_A^2 + a_0^2 - \sigma_B^2 - b_0^2)\phi\frac{a_0 - b_0}{\theta^2}\frac{\partial \theta}{\partial a_i} +$$

$$(a_0 + b_0)\frac{\partial \theta}{\partial a_i}\phi + (a_0 + b_0)\theta\frac{(a_0 - b_0)^2}{\theta^3}\phi\frac{\partial \theta}{\partial a_i} -$$

$$2z_0\frac{\partial z_0}{\partial a_i}$$

$$= 2a_i\Phi - 2z_0\frac{\partial z_0}{\partial a_i} + \left\{(-\sigma_A^2 - a_0^2 + \sigma_B^2 + b_0^2)\frac{a_0 - b_0}{\theta^2} + \right.$$

$$\left. a_0 + b_0 + \frac{(a_0^2 - b_0^2)(a_0 - b_0)}{\theta^2}\right\}\phi\frac{\partial \theta}{\partial a_i}$$

$$= 2a_i\Phi - 2z_0\frac{\partial z_0}{\partial a_i} + \left\{(-\sigma_A^2 - a_0^2 + \sigma_B^2 + \right.$$

$$\left. b_0^2 + a_0^2 - b_0^2)\frac{a_0 - b_0}{\theta^2} + a_0 + b_0\right\}\phi\frac{\partial \theta}{\partial a_i}$$

$$= 2a_i\Phi - 2z_0\frac{\partial z_0}{\partial a_i} + \left\{(\sigma_B^2 - \sigma_A^2)\frac{a_0 - b_0}{\theta^2} + a_0 + b_0\right\}\phi\frac{\partial \theta}{\partial a_i}.$$

Therefore, the sensitivity can be computed as $$\frac{\partial \sigma_Z}{\partial a_i} = \frac{1}{\sigma_Z}\left[a_i\Phi - z_0\frac{\partial z_0}{\partial a_i} + \left\{(\sigma_B^2 - \sigma_A^2)\frac{a_0 - b_0}{\theta^2} + a_0 + b_0\right\}\frac{\phi}{2}\frac{\partial \theta}{\partial a_i}\right]$$

Finally, $$\frac{\partial \sigma_Z}{\partial a_i} = \frac{1}{\sigma_Z}\left[a_i\Phi - z_0(a_i - b_i)\frac{\phi}{\theta} + \right. \quad (A.33)$$

$$\left. (a_i - b_i)\left\{a_0 + b_0 + (a_0 - b_0)\frac{\sigma_B^2 - \sigma_A^2}{\theta^2}\right\}\frac{\phi}{2\theta}\right].$$

A.3.3 With Respect to Uncorrelated Sensitivity

We derive the sensitivity of $\sigma_Z$ with respect to the uncorrelated term $a_r$.

$$\frac{\partial \sigma_Z^2}{\partial a_r} = 2\sigma_Z\frac{\partial \sigma_Z}{\partial a_r} \quad (A.34)$$

$$= \left(\frac{\partial \sigma_A^2}{\partial a_r} + \frac{\partial a_0^2}{\partial a_r}\right)\Phi + (\sigma_A^2 + a_0^2)\frac{\partial \Phi}{\partial a_r} +$$

$$\left(\frac{\partial \sigma_B^2}{\partial a_r} + \frac{\partial b_0^2}{\partial a_r}\right)(1 - \Phi) - (\sigma_B^2 + b_0^2)\frac{\partial \Phi}{\partial a_r} +$$

$$\left(\frac{\partial a_0}{\partial a_r} + \frac{\partial b_0}{\partial a_r}\right)\theta\phi + (a_0 + b_0)\frac{\partial \theta}{\partial a_r}\phi +$$

$$(a_0 + b_0)\theta\frac{\partial \phi}{\partial a_r} - 2z_0\frac{\partial z_0}{\partial a_r}$$

$$= 2a_r\Phi - (\sigma_A^2 + a_0^2 - \sigma_B^2 - b_0^2)\phi\frac{a_0 - b_0}{\theta^2}\frac{\partial \theta}{\partial a_r} +$$

$$(a_0 + b_0)\frac{\partial \theta}{\partial a_r}\phi + (a_0 + b_0)\theta\frac{(a_0 - b_0)^2}{\theta^3}\phi\frac{\partial \theta}{\partial a_r} -$$

$$2z_0\frac{\partial z_0}{\partial a_r}$$

$$= 2a_r\Phi - 2z_0\frac{\partial z_0}{\partial a_r} +$$

$$\left\{(-\sigma_A^2 - a_0^2 + \sigma_B^2 + b_0^2)\frac{a_0 - b_0}{\theta^2} + \right.$$

$$\left. a_0 + b_0 + \frac{(a_0^2 - b_0^2)(a_0 - b_0)}{\theta^2}\right\}\phi\frac{\partial \theta}{\partial a_r}$$

$$= 2a_r\Phi - 2z_0\frac{\partial z_0}{\partial a_r} +$$

$$\left\{(-\sigma_A^2 - a_0^2 + \sigma_B^2 + b_0^2 + a_0^2 - b_0^2)\frac{a_0 - b_0}{\theta^2} + \right.$$

$$\left. a_0 + b_0\right\}\phi\frac{\partial \theta}{\partial a_r}$$

$$= 2a_r\Phi - 2z_0\frac{\partial z_0}{\partial a_r} +$$

$$\left\{(\sigma_B^2 - \sigma_A^2)\frac{a_0 - b_0}{\theta^2} + a_0 + b_0\right\}\phi\frac{\partial \phi}{\partial a_r}.$$

Therefore, the sensitivity can be computed as $$\frac{\partial \sigma_Z}{\partial a_r} = \frac{1}{\sigma_Z}\left[a_r\Phi - z_0\frac{\partial z_0}{\partial a_r} + \left\{(\sigma_B^2 - \sigma_A^2)\frac{a_0 - b_0}{\theta^2} + a_0 + b_0\right\}\frac{\phi}{2}\frac{\partial \theta}{\partial a_r}\right]$$

Finally, $$\frac{\partial \sigma_Z}{\partial a_r} = \frac{1}{\sigma_Z}\left[a_r\Phi - z_0 a_r \frac{\phi}{\theta} + a_r\left\{a_0 + b_0 + (a_0 - b_0)\frac{\sigma_B^2 - \sigma_A^2}{\theta^2}\right\}\frac{\phi}{2\theta}\right]. \quad (A.35)$$

What is claimed is:

1. A method for determining a gradient of a parametric yield of an integrated circuit with respect to parameters of the delay of an edge of a timing graph of the circuit, the method comprising:
   conducting a statistical timing analysis;
   expressing a statistical circuit delay in terms of a delay of the edge by computing a statistical maximum of the edge's edge slack and complement edge slack; and
   computing a gradient of the statistical circuit delay with respect to parameters of the delay of the edge,
   wherein the gradient is computed using a non-numerical perturbation method.

2. The method of claim 1, wherein the edge slack includes a sum of a statistical arrival time at an initial node of the edge, a statistical edge delay, and a negative of a statistical required arrival time at a final node of the edge.

3. The method of claim 1, wherein the complement edge slack includes a statistical maximum of all edge slacks over a timing graph cutset excepting an edge of interest.

4. The method of claim 1, further comprising:
   using the gradient for one of the following:
      continuously optimizing the integrated circuit with yield considerations;
      discretely optimizing the integrated circuit with yield considerations;
      automatically optimizing the integrated circuit with yield considerations; and
      manually optimizing the integrated circuit with yield considerations.

5. The method of claim 1, further comprising:
   expressing a profit function of an integrated circuit in terms of the statistical circuit delay; and
   computing a gradient of the profit function with respect to parameters of the delay of the edge.

6. The method of claim 5, wherein the profit function includes one of the following:
   a parametric yield at a given performance;
   a performance at a given parametric yield; and
   a weighted sum of a parametric yield in each bin corresponding to a performance range.

7. The method of claim 5, wherein the gradient of a profit function is determined for at least one of: an objective function and at least one constraint.

8. The method of claim 1, wherein the gradient is determined with respect to an optimization parameter by chain-ruling.

9. The method of claim 1, wherein the statistical timing analysis is conducted in one of: a late-mode and an early-mode.

10. The method of claim 1, wherein the integrated circuit includes combinational elements, sequential elements, contains timing tests, and contains at least one of the following: flip-flops, master-slave latches, and transparent latches.

11. The method of claim 1, wherein the statistical timing analysis includes a criticality probability analysis.

12. The method of claim 1, wherein the integrated circuit is represented at any mixture of gate-level, block-level, and transistor-level.

13. A system for determining a gradient of a performance of an integrated circuit with respect to a delay of an edge of a timing graph of the circuit, the system comprising:
   a system for conducting a statistical timing analysis;
   a system for expressing a statistical circuit delay in terms of a delay of the edge by computing a statistical maximum of the edge's edge slack and complement edge slack; and
   a system for computing a gradient of the statistical circuit delay with respect to parameters of a delay of the edge,
   wherein the gradient is computed using a non-numerical perturbation method.

14. The system of claim 13, wherein the edge slack includes a sum of a statistical arrival time at an initial node of the edge, a statistical edge delay, and a negative of a statistical required arrival time at a final node of the edge.

15. The system of claim 13, wherein the complement edge slack includes a statistical maximum of all edge slacks over a timing graph cutset excepting an edge of interest.

16. The system of claim 13, further comprising:
   a system for using the gradient for one of the following:
      continuously optimizing the integrated circuit with yield considerations;
      discretely optimizing the integrated circuit with yield considerations;
      automatically optimizing the integrated circuit with yield considerations; and
      manually optimizing the integrated circuit with yield considerations.

17. The system of claim 13, further comprising:
   a system for expressing a profit function of an integrated circuit in terms of the statistical circuit delay; and
   a system for computing a gradient of the profit function with respect to the delay of the edge.

18. The system of claim 17, wherein the profit function includes one of the following:
   a parametric yield at a given performance;
   a performance at a given parametric yield; and
   a weighted sum of a parametric yield in each bin corresponding to a performance range.

19. The system of claim 13, wherein the statistical timing analysis includes a criticality probability analysis.

20. A program product stored on a computer-readable medium, which when executed, determines a gradient of a parametric yield of an integrated circuit with respect to parameters of a delay of an edge of a timing graph of the circuit, the program product comprising:
   program code for conducting a statistical timing analysis;
   program code for expressing a statistical circuit delay in terms of a delay of the edge; and
   program code for computing a gradient of the statistical circuit delay with respect to parameters of the delay of the edge,
   wherein the gradient is computed using a non-numerical perturbation method.

21. The program product of claim 20, further comprising:
   program code for using the gradient for one of the following:
      continuously optimizing the integrated circuit with yield considerations;
      discretely optimizing the integrated circuit with yield considerations;
      automatically optimizing the integrated circuit with yield considerations; and manually optimizing the integrated circuit with yield considerations.

22. The program product of claim 20, further comprising:
program code for expressing a profit function of an integrated circuit in terms of the statistical circuit delay; and
program code for computing a gradient of the profit function with respect to parameters of the delay of the edge, wherein the profit function includes one of the following:
a parametric yield at a given performance;
a performance at a given parametric yield; and
a weighted sum of a parametric yield in each bin corresponding to a performance range.

23. The program code of claim 20, wherein the statistical timing analysis includes a criticality probability analysis.

24. A method for deploying an application for determining a gradient of a parametric yield of an integrated circuit with respect to parameters of a delay of an edge of a timing graph of the circuit, comprising:
providing a computer infrastructure being operable to:
conduct a statistical timing analysis;
express a statistical circuit delay in terms of a delay of the edge; and
compute a gradient of the statistical circuit delay with respect to parameters of the delay of the edge,
wherein the gradient is computed using a non-numerical perturbation method.

* * * * *